(12) United States Patent
Laing

(10) Patent No.: US 6,659,214 B1
(45) Date of Patent: Dec. 9, 2003

(54) TRACKED VEHICLE OPERABLE BY A NON-TRACKED VEHICLE

(75) Inventor: Douglas Laing, Rocky Mountain House (CA)

(73) Assignee: R. Pollitt Oilfield Construction, Ltd., Leslieville (CA)

( * ) Notice: Subject to any disclaimer, the term of this patent is extended or adjusted under 35 U.S.C. 154(b) by 0 days.

(21) Appl. No.: 10/186,130

(22) Filed: Jun. 27, 2002

(51) Int. Cl.[7] ................................................ B60P 3/06
(52) U.S. Cl. ...................................... 180/198; 180/9.26
(58) Field of Search .............................. 180/9.26, 9.44, 180/198, 9, 9.1

(56) References Cited

U.S. PATENT DOCUMENTS

| | | | |
|---|---|---|---|
| 1,454,911 A | * 5/1923 | Stephenson | 180/9.26 |
| 2,282,745 A | * 5/1942 | Preston | 440/11 |
| 2,812,081 A | 11/1957 | Schrader | |
| 3,306,175 A | * 2/1967 | Ferwerda | 404/86 |
| 3,926,272 A | 12/1975 | Weber | |
| 4,391,343 A | 7/1983 | Deare | |
| 4,415,055 A | 11/1983 | Ahn | |
| 5,072,805 A | 12/1991 | Meiners | |

* cited by examiner

*Primary Examiner*—Daniel G. DePumpo
(74) *Attorney, Agent, or Firm*—Gene Scott-Patent Law & Venture Group

(57) ABSTRACT

A tracked vehicle adapted for receiving a wheeled vehicle and to be driven by the wheeled vehicle. The tracked vehicle has a chassis. Guide and drive wheels are mounted on the chassis at each side and a set of tracks are driven by the driven wheels and guided by the guide wheels. Rear wheels of the wheeled vehicle rest in a pair of drive rollers and rotating stiles are adapted for receiving steered wheels of the wheeled vehicle.

5 Claims, 2 Drawing Sheets

TRACKED VEHICLE OPERABLE BY A NON-TRACKED VEHICLE

BACKGROUND OF THE INVENTION

1. Field of the Invention

This invention relates to tracked vehicles and more specifically to a tracked vehicle adapted for being driven and steered by a wheeled vehicle.

2. Description of Related Art

The following art defines the present state of this field:

Schrader, U.S. Pat. No. 2,812,081 describes a tractor mover comprising a supporting frame having a front end and side members, endless ground engaging tracts on said side members supporting the same and adapted to support thereon endless treads of a tractor for driving of said tracks by said treads, upright frames on said side members at the front end of the frame, a ramp for loading a tractor onto said tracks, said ramp pivotally secured to said frame at such an elevation as to permit a tractor to pass from said ramp to said tracks, winch means having a flexible cable attached thereto secured to said frame for raising and ramp into a substantially upright position, guide rails adjacent to and extending above said tracts and secured to said frame for guiding the treads of a tractor onto said tracks, means for locking a tractor to said ramp against movement of the drive of said tracks by said treads comprising a drawbar attachable to a tractor, said ramp having a central opening receiving said drawbar when the ramp is raised, and pin secured means insertible through said drawbar in front of said ramp to prevent the drawbar from moving out of said opening, and front and rear extensible transverse connections between said side members to vary the spacing of the said tracks for tractors of different widths.

Weber, U.S. Pat. No. 3,926,272 describes an elongated vehicle supporting pallet structure is provided and includes opposite side longitudinally arranged crawler tract assemblies for support of the pallet structure form a soft ground surface. The pallet structure includes at least one pair of opposite side sets of rotatably supported transverse rollers with each set of rollers including a pair of rollers spaced apart longitudinally of the pallet structure and defining an upwardly opening wheel cradling recess therebetween for cradling the lower peripheral portions of an associated vehicle drive wheel therein with the drive wheel supported from and disposed in driving engagement with the rollers. A drive train drivingly connects at least one roller of each set of rollers to the corresponding crawler track assembly and each of the crawler track assemblies includes an independently operable brake assembly. The pallet structure includes upper surface portions for supporting a wheeled vehicle therefrom including a pair of opposite side drive wheel assemblies driven from a differential assembly and with the drive wheel assemblies driven from a differential assembly and with the drive wheel assemblies of the wheeled vehicle supportively cradled and driven by the corresponding set of pallet assembly rollers. The brake assemblies include hydraulic cylinder actuators each operatively connected to the corresponding brake assembly by means of a flexible hydraulic hose or line for portability of the actuators and to enable the latter to be supported in the operator's cab of a wheeled vehicle supported from the pallet structure. Also, the hydraulic cylinder actuators for the bake assemblies are provided with the foot treadle actuated operator portions.

Deare, U.S. Pat. No. 4,391,343 describes a convertible traction device for permitting a road vehicle to be used in an off-road configuration. The device is provided as a trailer having a pair of retractable road wheels with a pair of traction belt assemblies mounted thereon. The traction belt assemblies each include an endless belt, a plurality of support wheels about which the belt is entrained and a supporting framework, each assembly being pivotally attached to the trailer chassis. During towing the road wheels support the trailer on the ground with the traction belt assemblies being held in a retracted position above the trailer platform. For off-road use the traction belt assemblies are pivoted downwardly until the belts engage the ground, the assemblies are locked in position and the road wheels are retracted. The vehicle is driven onto the platform so that the drive wheels thereof engage drive rollers mounted in the trailer chassis, which rollers, as the vehicle's drive wheels rotate, impart driving movement to the traction belt. Operator controlled brakes on the drive rollers are used to stop the device and to turn the device to the left or the right.

Ahn, U.S. Pat. No. 4,415,055 describes a tracked vehicle to receive a wheeled vehicle and to be driven by the wheeled vehicle. The tracked vehicle has a chassis. Guide wheels are mounted on the chassis at each side and drive wheels mounted at at least the rear of the chassis, at each side. A track at each side of the vehicle is driven by the driven wheels and guided by the guide wheels. Drive members are attached to each drive wheel to receive a drive transmission. The chassis can receive and retain the wheeled vehicle further drive members are attachable to the driven wheels of the wheeled vehicle to receive the drive transmission so that driving of the driven wheels of the wheeled vehicle drives the tracks of the tracked vehicle.

Meiners, U.S. Pat. No. 5,072,805 describes a high clearance frame construction for supporting a motor vehicle, and in particular a truck, for use as a tractor-like device for farming and other such related chores. The frame construction includes front and rear tractor-like wheels. The front frame wheels are steered independent of one another through the cooperation of the steering components of the motor vehicle mounted thereon. Likewise, the rear frame wheels are driven by adapting the power take off of the vehicle to independently power each rear wheel. Independent arrangement of the steering and driving components that permits the high clearance feature of the device. The frame construction also features an adjustable frame such that both the overall length and width of the construction may be varied to accommodate different size vehicles. The frame construction is made operational for spraying crops by mounting a spraying tank and boom on the vehicle thereon.

The prior art teaches vehicles that are mounted atop motive means. The prior art also teaches that such configurations may include the use of such a mounted vehicle to power and to steer the motive means. This is of particular importance with the mounted vehicle is able to acquire the ability to move over terrain that it is not designed for. Weber and Ahn each teaches such a configuration where a wheeled vehicle is mounted on a tracked chassis and is used to power and steer the tracked chassis. The present invention teaches a particularly improved version of such and provides related advantages as described in the following summary.

SUMMARY OF THE INVENTION

The present invention teaches certain benefits in construction and use which give rise to the objectives described below.

The present invention seeks to provide a tracked vehicle adapted to receive a conventional road vehicle, for example a truck, so that the tracked vehicle may be driven in mud providing the advantages of the excellent traction of tracked vehicles while avoiding the cost of providing an integral power source for the tracked vehicle.

Accordingly, the present invention is a tracked vehicle enabled for receiving a wheeled vehicle and to be driven and steered by the wheeled vehicle. The tracked vehicle comprises a chassis, guide and drive wheels mounted on the chassis at each side, a track at each side of the vehicle driven by the drive wheels, a driven member engaged with the drive wheels and adapted for receiving rotational energy from a wheeled vehicle's driven wheels, a pair of docks for receiving rotating forces from the steered wheels of the wheeled vehicle, where the chassis is adapted to receive and retain the wheeled vehicle, and a sliding member enabled for allowing a vehicle of any wheel base to couple with the steering and driving members of the tracked vehicle.

A primary objective of the present invention is to provide an apparatus and method of use of such apparatus that provides advantages not taught by the prior art.

Another objective is to provide such an invention capable of being powered and steered by a wheeled vehicle.

A further objective is to provide such an invention capable of receiving a range of wheeled vehicles with various wheel base dimensions.

A still further objective is to provide such an invention capable of being fabricated with light construction and at low cost.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
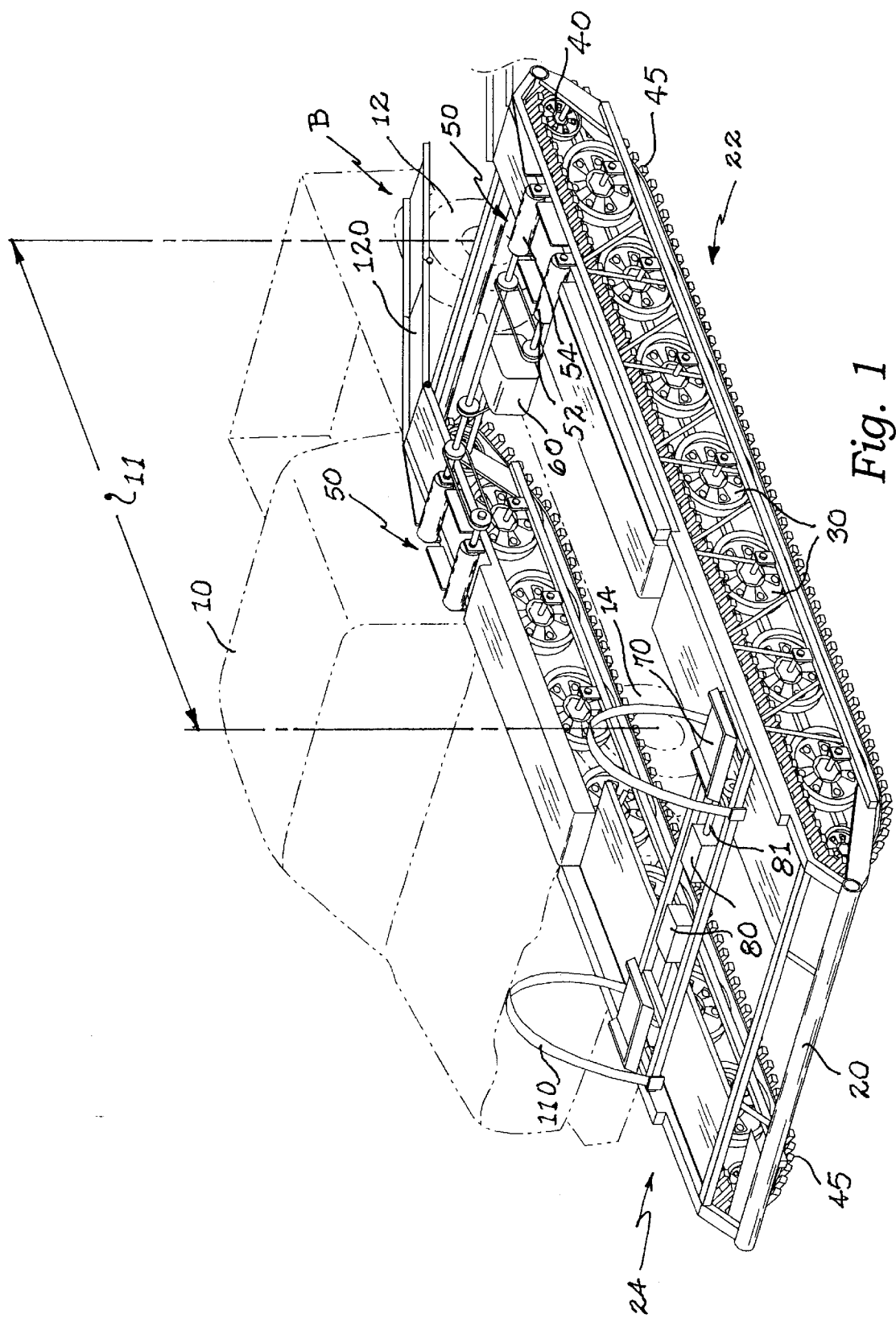
FIG. 1 is a perspective partial exploded view of the preferred embodiment of the invention a tracked vehicle.
Figure 2:
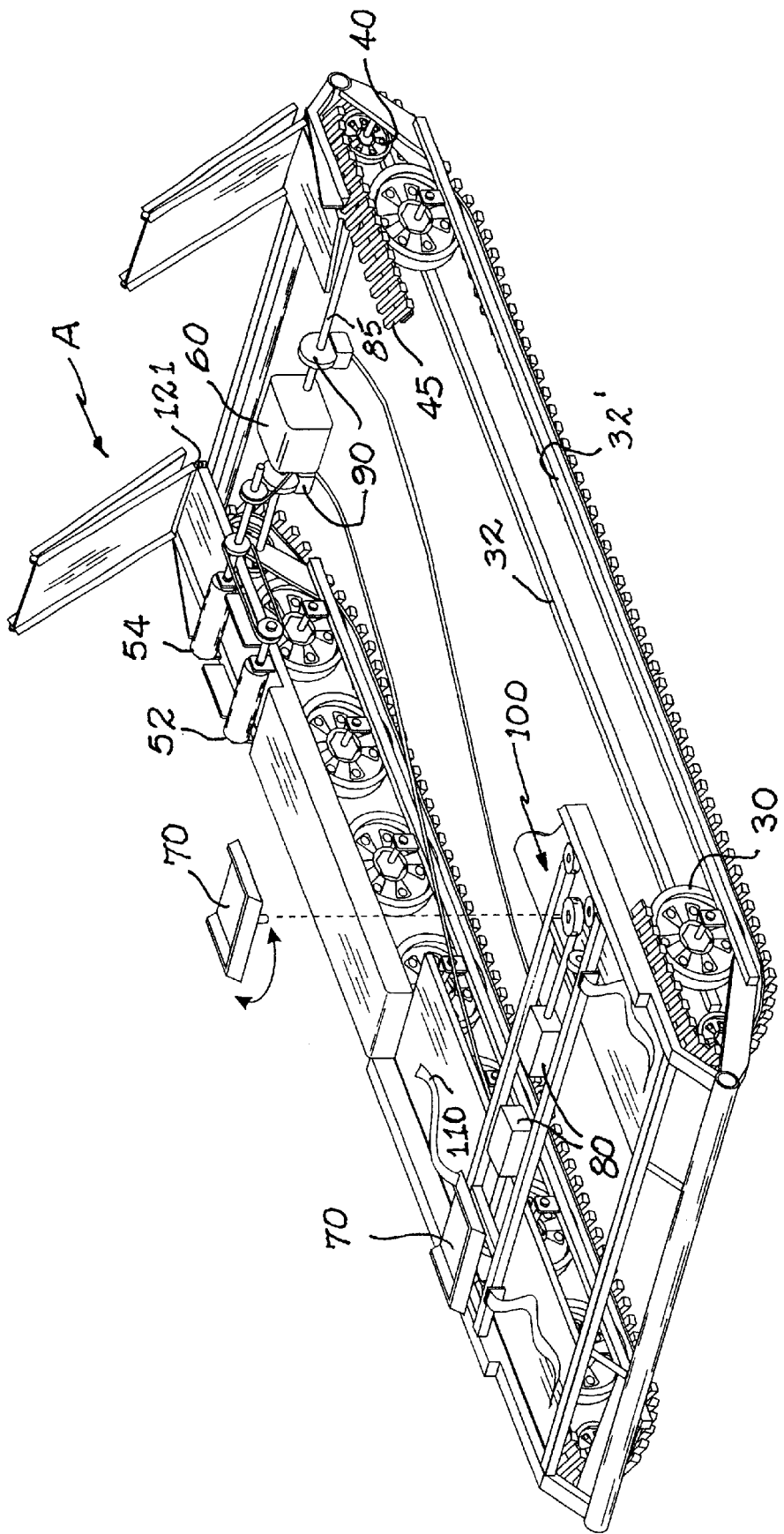
FIG. 2 is a similar view thereof showing a wheeled vehicle positioned for driving the tracked vehicle.

The present invention is a tracked vehicle apparatus, as shown in the figures, adapted to receive a wheeled vehicle 10, which is shown in FIG. 1 using phantom lines since it is not a part of the invention. The apparatus is driven by the wheeled vehicle 10. The apparatus provides a chassis 20 adapted, by guide wheel mounting bars 32, 32' (part of chassis 20) to receive on each side 22, 24 plural guide wheels 30, and also, at least one drive wheel 40 all of which are rotatably engaged with the chassis 20. Articulated continuous tracks 45, of any well known construction, are engaged for rotation about the guide wheels 30 the drive wheel 40, on each side, and these tracks 45 support the chassis 20 for vehicular movement. On each side, a drive roller assembly 50 is adapted, as described below, for receiving an applied rotational force and for transmitting the rotational force to the drive wheel 40 through an open differential gear box 60. Such a gear box, as is well known, will drive one side drive wheel 40 if the other is locked. Again, on each side of the apparatus, a docking stile 70, as best seen in FIG. 2, is adapted by its size, shape and construction for receiving an applied turning force, and is engaged by a mechanical link 81, with a brake cylinder 80 such that rotation of the docking stile 70 actuates the brake cylinder 80 in a first rotational sense, and releases the brake cylinder 80 in an opposite rotational sense. The two stiles 70 and brake cylinders 80 are arrange in a push-pull arrangement such that although both stiles are rotated in the same direction, by the steered wheels of the wheeled vehicle 10, one of the brake cylinders 80 is actuated while the other one is deactivated. A disc brake caliper assembly 90, located integrally with the rear axle 85 of the apparatus, is functionally engaged with the brake cylinders 80 for retarding the drive wheel 40 on the same side when the corresponding docking stile 70 is rotated toward that same side 22, 24 of the appartus.

A slide rail assembly 100 is engaged for sliding along the chassis, as shown in FIG. 2, and carries the docking stiles 70. When the wheeled vehicle 10 drives onto the vehicle, as will be described below, its front (steered) wheels engage the slide rail assembly 100 and push it forward on the apparatus until the rear (braked) wheels engage the drive roller assemblies 50. In this manner wheeled vehicles of differing wheel base 11 dimensions are able to adapt the apparatus for engaging their size in steering and powering, i.e., it is adapted for being positioned at a distance from the drive roller assemblies 50 equal to the wheelbase 11 of the wheeled vehicle 10. It is noted that the wheelbase of a vehicle is the distance between the centers of the front and rear axles of the vehicle and defines the points where the tires of a wheeled vehicle touch the ground or the supporting surface upon which the vehicle rests.

As seen in the figures, each drive roller assembly 50 comprises a pair of rollers 52, 54 of such size and spacing as to receive, in support thereon, a driven wheel 12 of the wheeled vehicle 10. These rollers are rotated by the driven wheel 12 of the wheeled vehicle 10. It should be understood that the driven wheel 12 rotates the rollers 52, 54 through contact and to mutual friction as the driven wheel 12 is rotated by the engine and drive train of the wheeled vehicle 10.

A means for removably fixing 110, such as the straps shown best in FIG. 1, are applied to both steered wheels 14 of the wheeled vehicle 10, and this engages these wheels with the docking stiles 70 for rotating the docking stiles 70 with the steered wheels 14 of the wheeled vehicle 10. Other means for engaging the stiles 70 with the steered wheels 14 may be utilized as necessary to assure integral motion of these two elements.

A ramping means 120, such as the hinged ramps shown in the figures, is hingably engaged with the chassis 20 at hinges 121, and are positionable between an upwardly hinged position "A" shown in FIG. 2, for storage of the ramping means 120 when the apparatus is not in use, and also when the apparatus is in use, i.e., being driven by the wheeled vehicle 10, and a downwardly hinged position "B" for loading and unloading of the wheeled vehicle onto and off of the apparatus.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tracked vehicle apparatus adapted to receive a wheeled vehicle and to be driven by the wheeled vehicle, the tracked vehicle apparatus comprising: a chassis adapted to receive on each side thereof: plural guide wheels, and at least one drive wheel rotatably engaged with the chassis, a continuous track engaged for rotation about the guide wheels and the at least one drive wheel, and for supporting the chassis in vehicular movement; a drive roller assembly adapted for receiving an applied rotational force and for transmitting the rotational force to the at least one drive wheel through an open differential gear box; a docking stile, adapted for receiving an applied turning force, the docking stile engaged with a brake cylinder such that rotation of the docking stile actuates the brake cylinder in a first rotational sense and releases the brake cylinder in an opposite rotational sense; a disc brake caliper assembly functionally engaged with the brake cylinder for retarding the drive wheel when the docking stile is rotated in the first rotational sense.

2. The apparatus of claim 1 further comprising a slide rail assembly engaged with each said docking stile and adapted for being positioned at a distance from each said drive roller assembly equal to a wheelbase of the wheeled vehicle.

3. The apparatus of claim 1 wherein each said drive roller assembly comprises a pair of rollers of such size and spacing as to receive, in support thereon, a driven wheel of the wheeled vehicle for being rotated by the driven wheel of the wheel vehicle.

4. The apparatus of claim 1 further comprising a means for fixing a steered wheel of the wheeled vehicle to each said docking stile for rotating the docking stiles with the steered wheels of the wheeled vehicle.

5. The apparatus of claim 1 further comprising a ramping means hingably engaged with the chassis and positionable in an upwardly hinged position for storage thereof, and a downwardly hinged position for loading and unloading the wheeled vehicle onto the apparatus.

\* \* \* \* \*